(12) United States Patent
Backmann et al.

(10) Patent No.: US 9,114,578 B2
(45) Date of Patent: Aug. 25, 2015

(54) FILM BLOWING HEAD

(75) Inventors: Martin Backmann, Lengerich (DE); Klemens Sensen, Lengerich (DE)

(73) Assignee: WINDMOELLER & HOELSCHER KG

( * ) Notice: Subject to any disclaimer, the term of this patent is extended or adjusted under 35 U.S.C. 154(b) by 0 days.

(21) Appl. No.: 13/885,784

(22) PCT Filed: Oct. 26, 2011

(86) PCT No.: PCT/EP2011/068706
§ 371 (c)(1),
(2), (4) Date: May 16, 2013

(87) PCT Pub. No.: WO2012/076245
PCT Pub. Date: Jun. 14, 2012

(65) Prior Publication Data
US 2013/0230614 A1 Sep. 5, 2013

(30) Foreign Application Priority Data

Dec. 8, 2010 (DE) .......................... 10 2010 053 775

(51) Int. Cl.
*B29C 47/06* (2006.01)
*B29C 47/20* (2006.01)
*B29D 7/01* (2006.01)
*B29C 47/70* (2006.01)
*B29C 47/26* (2006.01)
(Continued)

(52) U.S. Cl.
CPC . *B29D 7/01* (2013.01); *B29C 47/06* (2013.01); *B29C 47/20* (2013.01); *B29C 47/705* (2013.01); *B29C 47/0026* (2013.01); *B29C 47/26* (2013.01); *B29C 47/265* (2013.01); *B29C 47/268* (2013.01); *B29C 2791/007* (2013.01); *B29L 2023/001* (2013.01)

(58) Field of Classification Search
CPC ........ B29C 47/06; B29C 47/20; B29C 47/26; B29C 47/265; B29C 47/268; B29C 47/705
USPC ............................... 425/133.1, 380, 462, 467
See application file for complete search history.

(56) References Cited

U.S. PATENT DOCUMENTS

| 3,809,515 A | 5/1974 | Farrell |
| 4,201,532 A * | 5/1980 | Cole ............................. 425/380 |
| 5,045,254 A | 9/1991 | Peelman et al. |

(Continued)

FOREIGN PATENT DOCUMENTS

| DE | 2329792 | 1/1975 |
| DE | 4407060 | 9/1994 |

(Continued)

*Primary Examiner* — Yogendra Gupta
*Assistant Examiner* — Joseph Leyson
(74) *Attorney, Agent, or Firm* — Jacobson Holman, PLLC.

(57) ABSTRACT

A film blowing head for the production of film tubing from a single or multi-layer film includes an extrusion gap to form a film layer. The extrusion gap is embodied between two boundary walls, with at least one melt pipeline mouthing into the extrusion gap, which converts inside the extrusion gap into a first melt channel, which is formed in a section of the progression of the first melt channel by recesses in the two boundary walls of the extrusion gap, and which distributes melt in the extrusion dap. The first melt channel tapers in the progression in the direction of transportation of the melt (h), and in an end section, entirely converts into the extrusion gap. The first melt channel is formed at one of the sections only by the recesses in one of the two boundary walls.

16 Claims, 9 Drawing Sheets

(51) Int. Cl.
*B29C 47/00* (2006.01)
*B29L 23/00* (2006.01)

(56) References Cited

U.S. PATENT DOCUMENTS 5,076,776 A * 12/1991 Yamada et al. ............ 425/133.1
5,716,650 A    2/1998 Mavridis
2003/0026868 A1    2/2003 Sensen et al.

FOREIGN PATENT DOCUMENTS

| | | |
|---|---|---|
| DE | 20307412 | 8/2003 |
| EP | 1055504 | 2/2003 |
| WO | WO 03/033238 | 4/2003 |

* cited by examiner

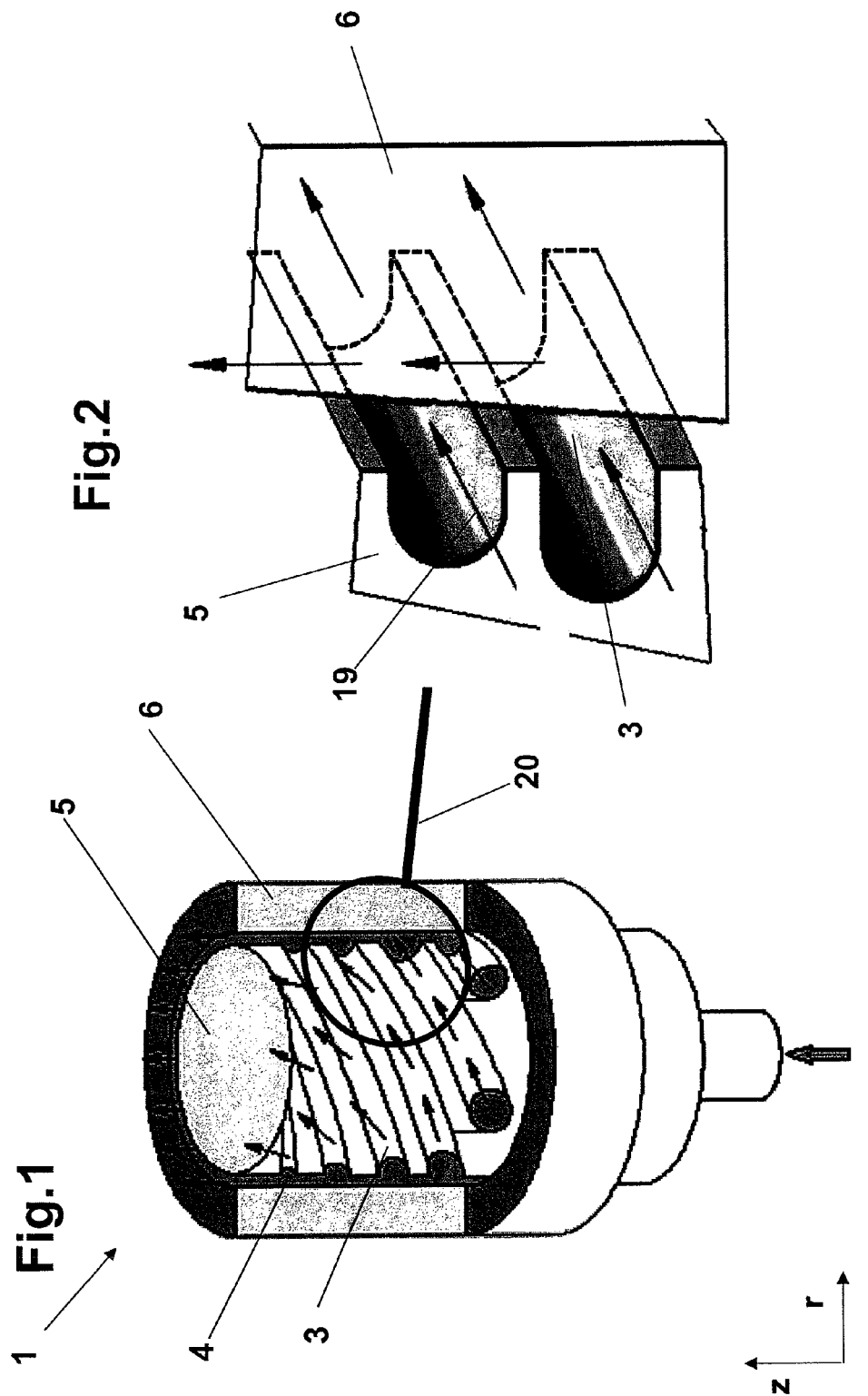

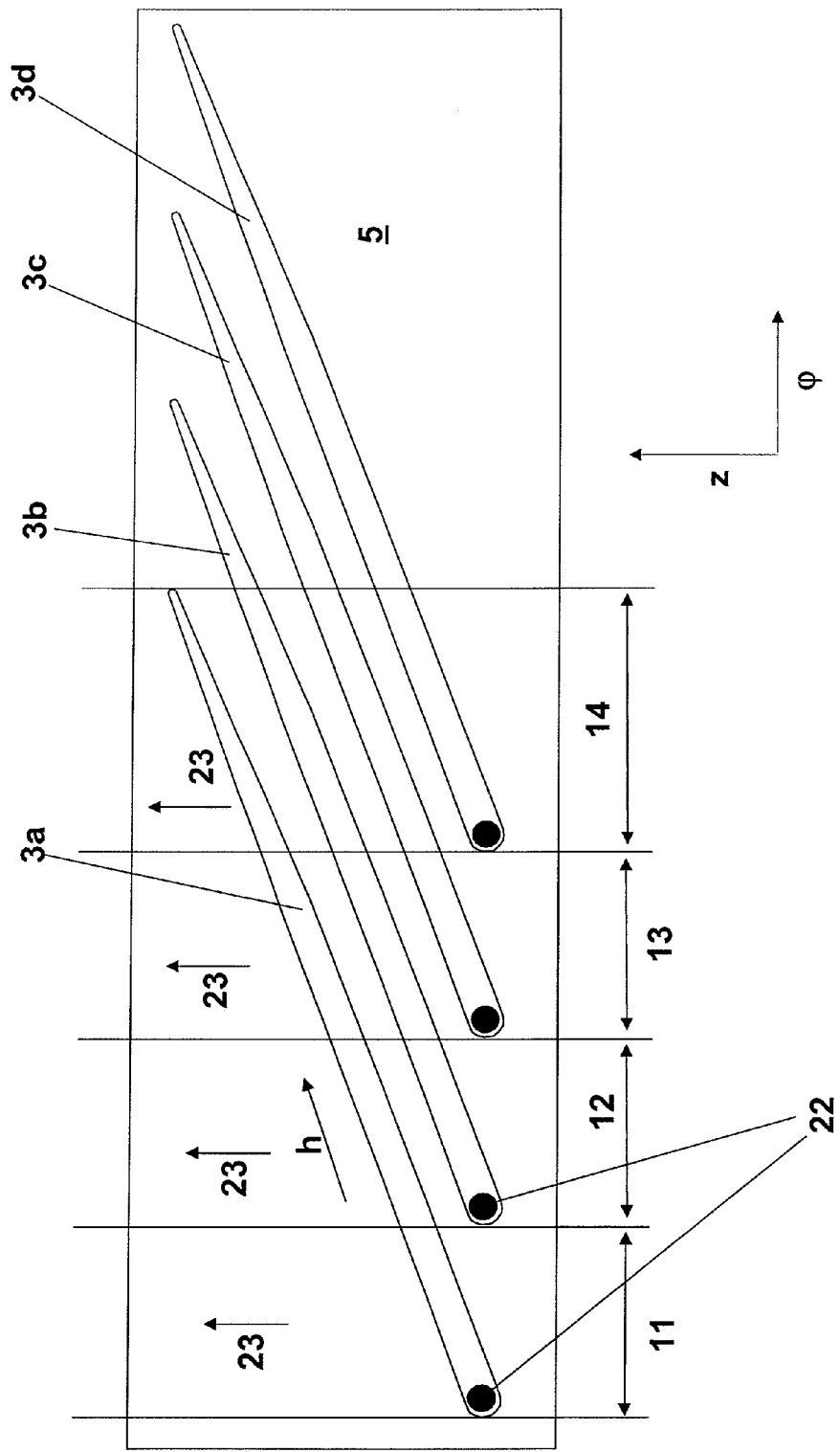

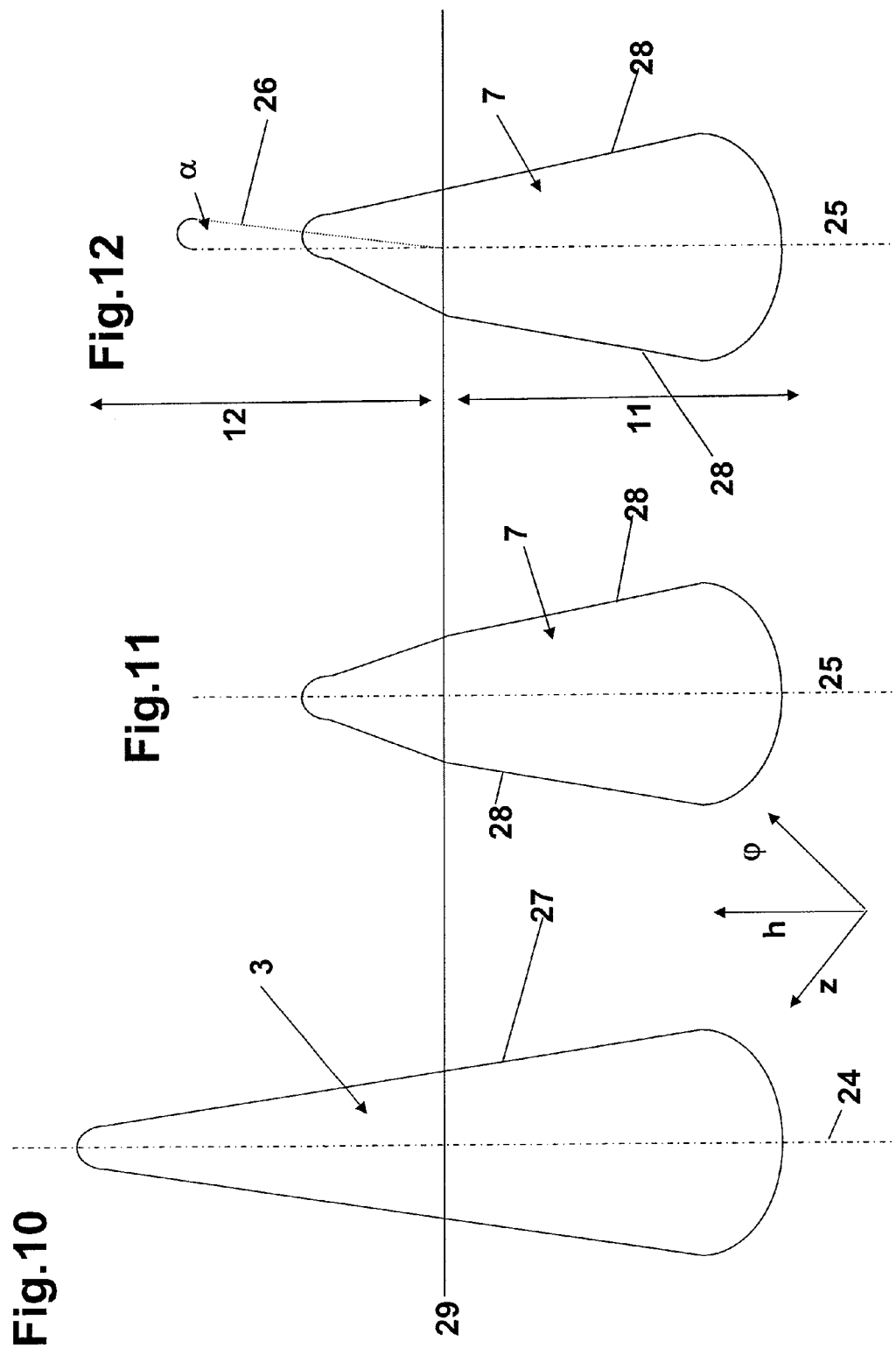

FILM BLOWING HEAD

CROSS-REFERENCE TO RELATED APPLICATIONS

This is a national stage of PCT/EP11/68706 filed Oct. 26, 2011, and published in English, which claims the priority of DE 102010053775.6 filed Dec. 8, 2010, hereby incorporated by reference.

BACKGROUND OF THE INVENTION

1. Field of Invention

The invention relates to a film blowing head for the production of film tubing comprising a single or multi-layer film. Such film blowing heads are known.

2. Description of the Prior Art

Generally they have in common that they are fed with melt from one or more extruders. This melt frequently passes through a pre-distributor, by which the melt is divided over a larger number of melt pipelines. During their further travel through the blowing head the melt pipelines mouth in extrusion gaps, which by its flat, planar embodiment can convert the melt strand, showing a circular cylindrical cross-section, which exits the melt pipelines, into a film or a film layer. If a single-layer film is produced, a single such gap is required. For the production of a film with a number n of layers generally here n number of such gaps is needed as well.

After a mouthing of the melt pipeline in the extrusion gap, the melt pipelines convert into melt channels, which are formed by recesses in one or both of the boundary walls of the extrusion gap. The melt channels extend along the boundary walls of the extrusion gap, in order to distribute the melt in said extrusion gap. During their progression in the extrusion gap the melt pipelines increasingly taper until they finally convert entirely into the extrusion gap.

The publications EP 1055504 B1, DE20307412 U1, as well as U.S. Pat. No. 5,716,650 B show, among other things, the above-mentioned facts. When comparing the general design of the blowing heads shown in the three publications here general differences are striking, though:

U.S. Pat. No. 5,716,650 B shows a film blowing head, which essentially comprises a stack of round plates, which show a round recess in their center (round perforated disks). The exterior diameter and the diameter of the round recess are identical in the round plates of a blowing head. The stack of round plates, in the area of said round recess, is provided with an inner mandrel and shows an overall circular cylindrical shape. The melt is fed from the outside to the multi-layer blowing head via initially externally extending melt pipelines in the radial direction. The individual plates define the individual extrusion gaps, which form the respective film layer. The melt pipelines feed the melt to the gaps. After the gap is reached the melt pipelines convert into melt channels, which in the film gap point helically towards the center of the circular cylinder. Generally the melt pipelines are only formed by a groove in one of the two plates limiting the respective gap. U.S. Pat. No. 5,716,650 B shows however a blowing head, in which the channels are formed by grooves in both plates limiting the respective gap.

Over their path in the direction towards the center of the blowing head the helically extending grooves taper (their depth in the walls of the gap reduces) until the grooves end entirely. At the points the grooves end the melt has entirely converted into the gap. Over its remaining path through the gap the melt is further formed into its "new" planar shape. Finally the gaps forming the individual layers of the film end by mouthing in the multi-layer gap, which exists between the inner mandrel and the plates. By the individual layers of film mouthing here a melt flow develops, which already includes the layers of the future multi-layer film. The extrusion of this melt flow occurs by an annular gap, which is typical for film blowing heads. Film blowing heads of the above-described type, which are formed by a stack of plates, are frequently called "stack die," as common in the English language.

EP 1055504 B1 shows such a stack die, which however comprises a few structural differences in its design in reference to the stack die of U.S. Pat. No. 5,716,650 B.

Individual gaps mouth in the multi-layer gap, which are guided in the radial direction of the blowing head from the inside and from the outside towards the multi-layer gap. Individual disks show conical forms.

In the context with such a film blowing head, frequently the use of a melt pre-distributor is recommended, which distributes the melt inside a closed component over several pipelines.

An alternative design of a film blowing head is shown in DE 203 07 412 U1. In these blowing heads the extrusion gap, forming the individual layers, already extends circular and cylindrical around the primary axis of symmetry of the blowing head, which is also circular and cylindrical.

Melt channels extend along this extrusion gap like helixes, which also taper in the direction towards the mouthing of the melt channel to a common melt channel at the upper axial end of the blowing head by their reduction in depth in the boundary walls of the melt channels until they entirely convert into said melt channel. Here, it must be stated that, contrary to many other documents of prior art, DE 203 07 412 U1 also shows melt channels formed by recesses in both boundary walls of the melt channels.

Obviously here, both by DE 203 07 412 U1 as well as by U.S. Pat. No. 5,716,650 B, the formation of striations or exudation marks in the film should be avoided. However, the measures suggested in these two publications cannot entirely prevent the formation of striations or exudation marks, so that professional users still need a solution for these two problems.

SUMMARY OF THE INVENTION

The objective of the present invention is therefore to suggest a film blowing head by which a film can be produced showing fewer striations and exudation marks.

The present invention is based on a blowing head according to U.S. Pat. No. 5,716,650 B and attains the aforementioned objective by adding the features of the invention described herein.

Surprisingly, it has shown that the formation of striations and the like is reduced when in one section of at least one melt channel said melt channel is formed only by recesses in one of the two boundary walls of the melt channel.

This circumstance may be connected to the fact that by the above-mentioned measure, the entire melt strand is pressed to the side of the extrusion gap and thus is better kneaded. This measure yields even better results when the melt strand at the beginning of the melt channel remains in a mold with a round or oval cross-section. Here, it can initially evenly distribute in the area of the two boundary walls when the round or oval cross-section is symmetrical in reference to the extrusion gap. It is also discernible from these explanations that it is advantageous for the melt channel in its initial section to be formed by recesses in both of its boundary walls.

When the depth of the recesses forming the melt channel increases in the direction of transportation of the melt, the kneading of the melt in the channel is promoted at least in one of the two boundary walls and over at least one section of the melt channel. This effect also occurs when the depth increases in both walls. However, by this measure the volume of the melt channel increases to a relatively large extent so that any reflux of the melt from the channel into the gap must be ensured. Accordingly the latter mentioned measure (increase of depth in both walls in the direction of transportation of the melt) can be used only to a moderate extent.

Frequently here sections are used in which at one height of the melt channel the depth of the recesses in one boundary wall reduces and increases in the other one. When the depth changes at one height of the melt channel in the two walls by the respectively same amount, but with a different algebraic sign, surprisingly worse results develop than in melt channels in which the amounts are different.

Initially, it seems obvious to design the progression of the depth of the channel in both boundary walls as a periodic function, in which a phasing of 90° ensures in angular functions so that in the first boundary wall, a depth maximum occurs at the height at which a depth minimum occurs in the other boundary wall. The progression of the two functions (the "height of the melt channel") fades in the further progression of the channel. It has proven advantageous in at least one section of at least one channel to deviate from this generally advantageous rule and to subject the progression of the channel depth in the two boundary walls to two different functions.

For this measure in particular, the central sections of a melt channel are recommended. For the purpose of this publication, the progression of a melt channel can be divided into four sections: a starting section, a first and a second central section, and an end section.

The above-mentioned advantageous measures described with regards to the progression of walls in an extrusion gap include the different length of the two grooves, which form a melt pipeline merging in an extrusion gap. Of course, frequently the different lengths coincide with the respective recesses in the direction of transportation of the melt ending before the shorter grooves or recesses.

In the meantime, many high-end film blowing heads represent multi-layer blowing heads. Such blowing heads are provided with several extrusion gaps, in which one layer of film each is formed. With regards to such multi-layer film blowing heads it has proven advantageous when the longer of two groves forming the tapering melt pipelines in one of these several gaps are arranged on the other side of the extrusion gap than the longer ones of the grooves, which form the tapering melt pipelines in a second of these several gaps. It has shown particularly advantageous when the boundary wall, which contacts the later exterior wall of the film composite in an extrusion gap, is provided with a longer groove or with longer grooves. On the other side of the respective extrusion gap, i.e., on the opposite boundary wall of the respective extrusion gap, therefore shorter grooves are located. In a cylindrically designed multi-layer film blowing head of this type accordingly the longer grooves were located at the exterior boundary wall of the outermost extrusion gap and advantageously at the interior boundary wall of the innermost extrusion gap.

In a blowing head designed in the stack die fashion, the longer grooves of the respectively tapering melt channels would be located in the upper boundary wall of the uppermost extrusion gap and/or in the lowermost boundary wall of the lowermost extrusion gap.

Additionally examples of the invention are discernible from the respective description and the claims.

BRIEF DESCRIPTION OF THE DRAWINGS

The individual figures show:
FIG. 1 a schematic functional sketch of a film blowing head 1

FIG. 2 an enlarged detail of FIG. 1
FIG. 3 a body wrap of a melt distributor
FIG. 4 a cross-section A-B through a first melt channel
FIG. 5 a cross-section A-B through a second melt channel
FIG. 6 a cross-section A-B through a third melt channel
FIG. 7 a cross-section A-B through a fourth melt channel
FIG. 8 a cross-section A-B through a fifth melt channel
FIG. 9 a body wrap of a melt distributor
FIG. 10 a first recess in a boundary wall
FIG. 11 a second recess in a boundary wall
FIG. 12 a third recess in a boundary wall

DETAILED DESCRIPTION OF THE PREFERRED EMBODIMENTS

Figure 3:
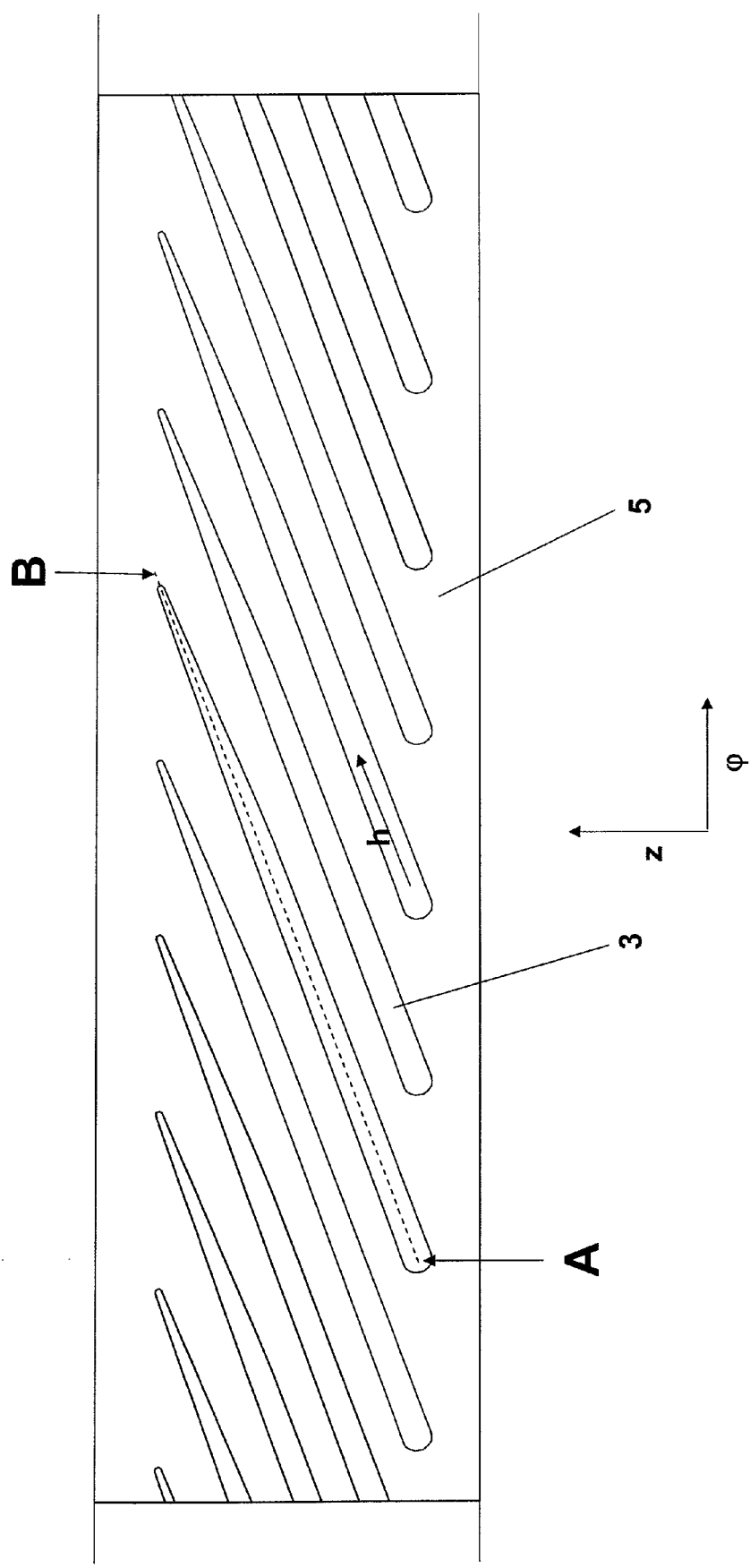

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

FIG. 1 shows an example of a single layer blowing head 1, which comprises only one extrusion gap 4, showing a circular cylindrical shape. In this case the circular cylindrical blowing head 1 and the extrusion gap 4 are also arranged symmetrically in reference to the primary axis of symmetry of the blowing head. The extrusion gap of such a blowing head 1 is limited by an inner mandrel 5 and a housing 6. In order to achieve a greater abstraction for other types of blowing heads than stack die blowing heads here an interior boundary wall 5 and an exterior boundary wall 6 should be discussed, though. In this context, in stack die blowing heads upper and lower boundary walls were to be discussed.

Once more FIG. 2 shows a detailed view of a melt channel, which is realized, as shown in prior art, only by a recess 3 or groove in the interior boundary wall 5.

FIG. 3 shows a body wrap of the circumferential area of the mandrel 5 and thus the melt distributor of the blowing head 1. Here, primarily the position of the section line A-B is interesting and the recess 3 discernible as a groove.

Figure 4:
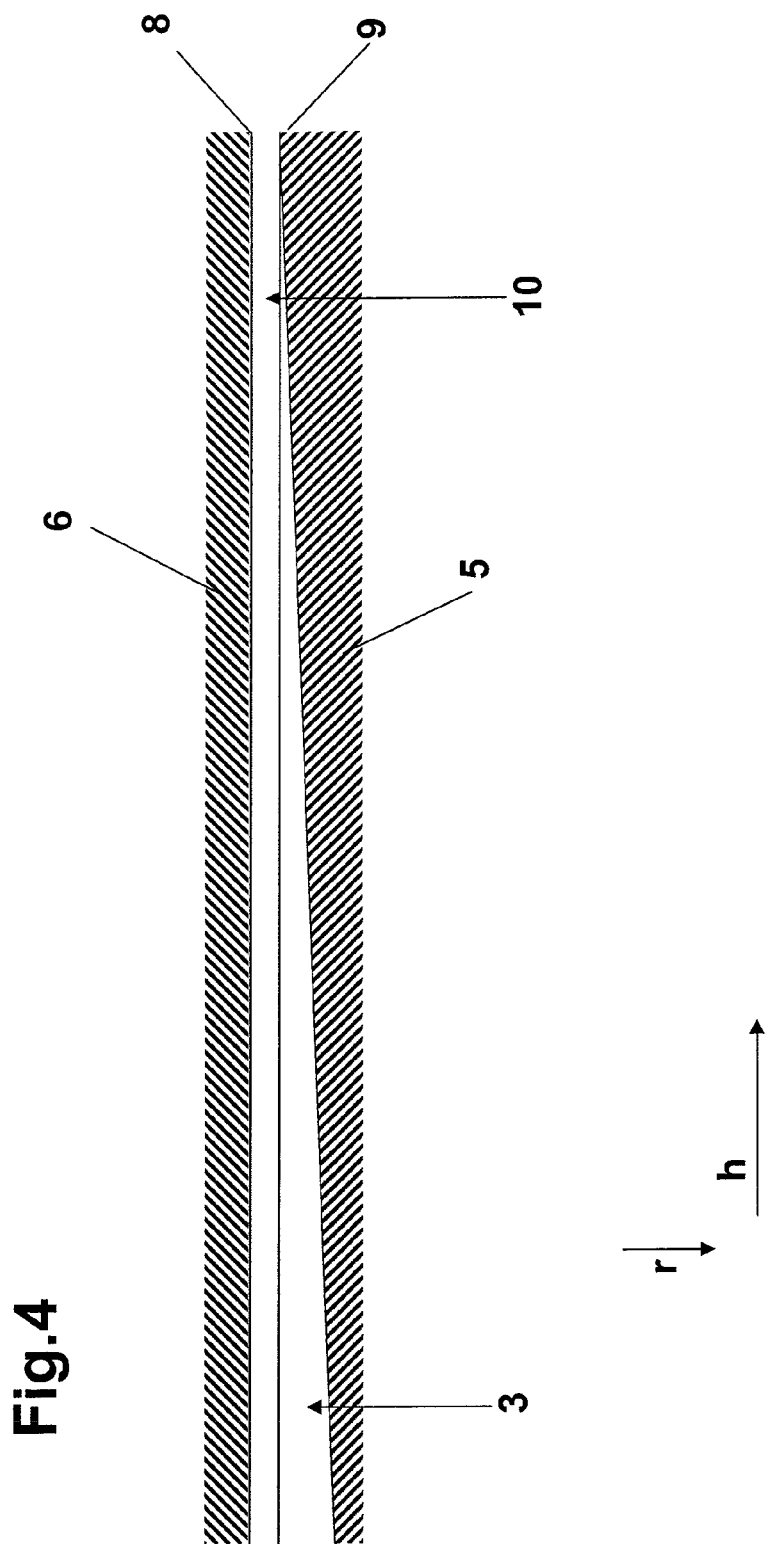

FIG. 4 now illustrates the progression of the groove/recess 3 of the blowing head 1 in the cross-section A-B. The depth T1 of the melt channel 3, measured from the interior boundary line 8 of the melt gap 4, constantly reduces until the channel finally has transferred into the gap.

Figure 5:
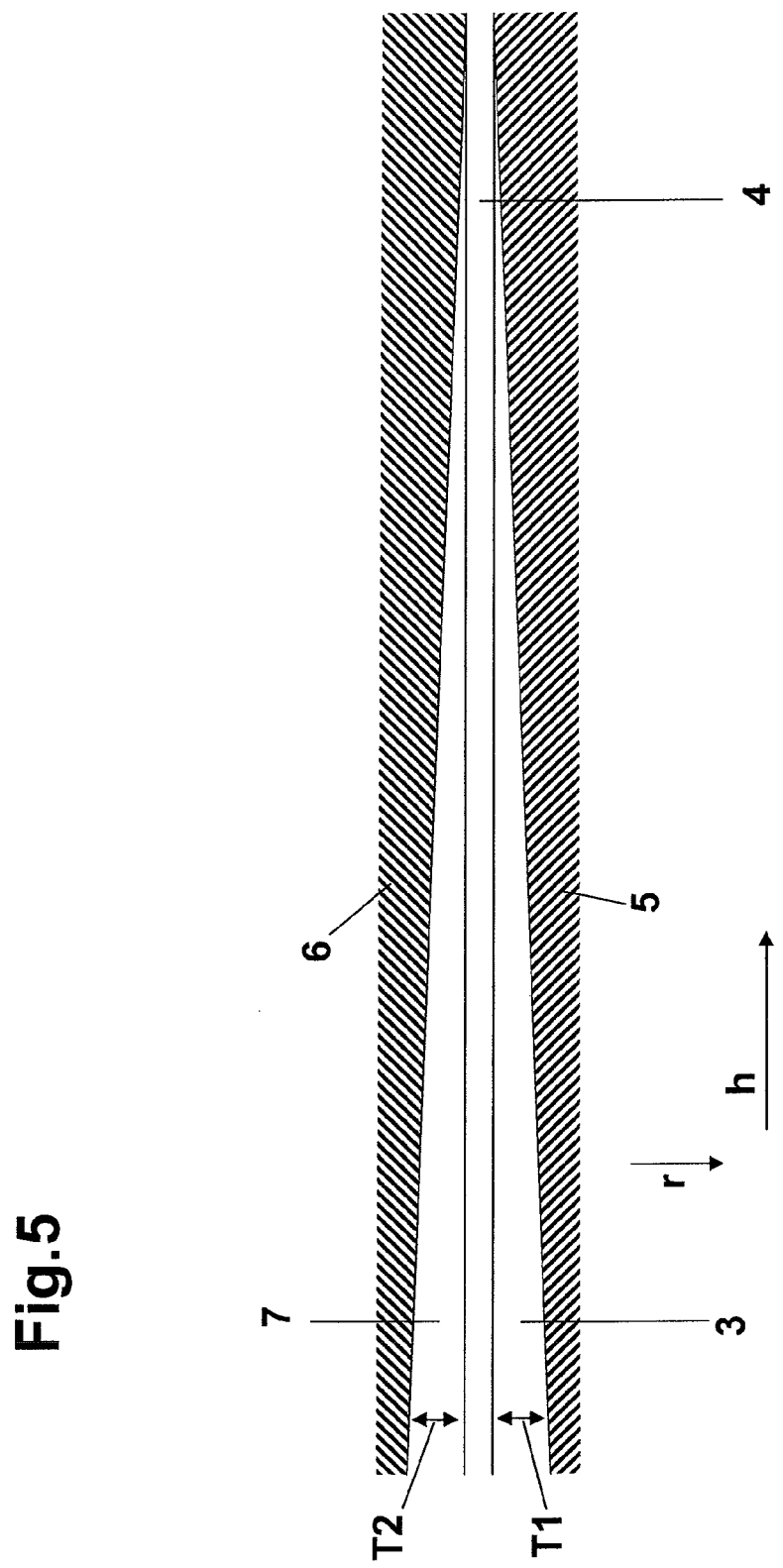

FIG. 5 shows a cross-section A-B through another melt channel 10, which is formed by both recesses 3 in the internal boundary wall 5 as well as recesses 7 in the exterior boundary wall 6. It is discernible from the drawing that the depths T1 and T2 reduce "uniformly" in the direction of the height of the melt channel 10. As a function of the height h of the melt channel 10 the two depths T1 and T2 are reduced with the same algebraic sign and the same amounts. Here, the height h of the melt channel 10 represents a flow variable indicating the length of the melt channel along the direction of the melt channel. It is therefore different, for example from the cylinder coordinates z, because the melt channel 10 doesn't extend exclusively in the axial direction.

In the exemplary embodiment shown here the diameter D of the channel reduces homogenously and steadily as a function of the height h.

Figure 6:
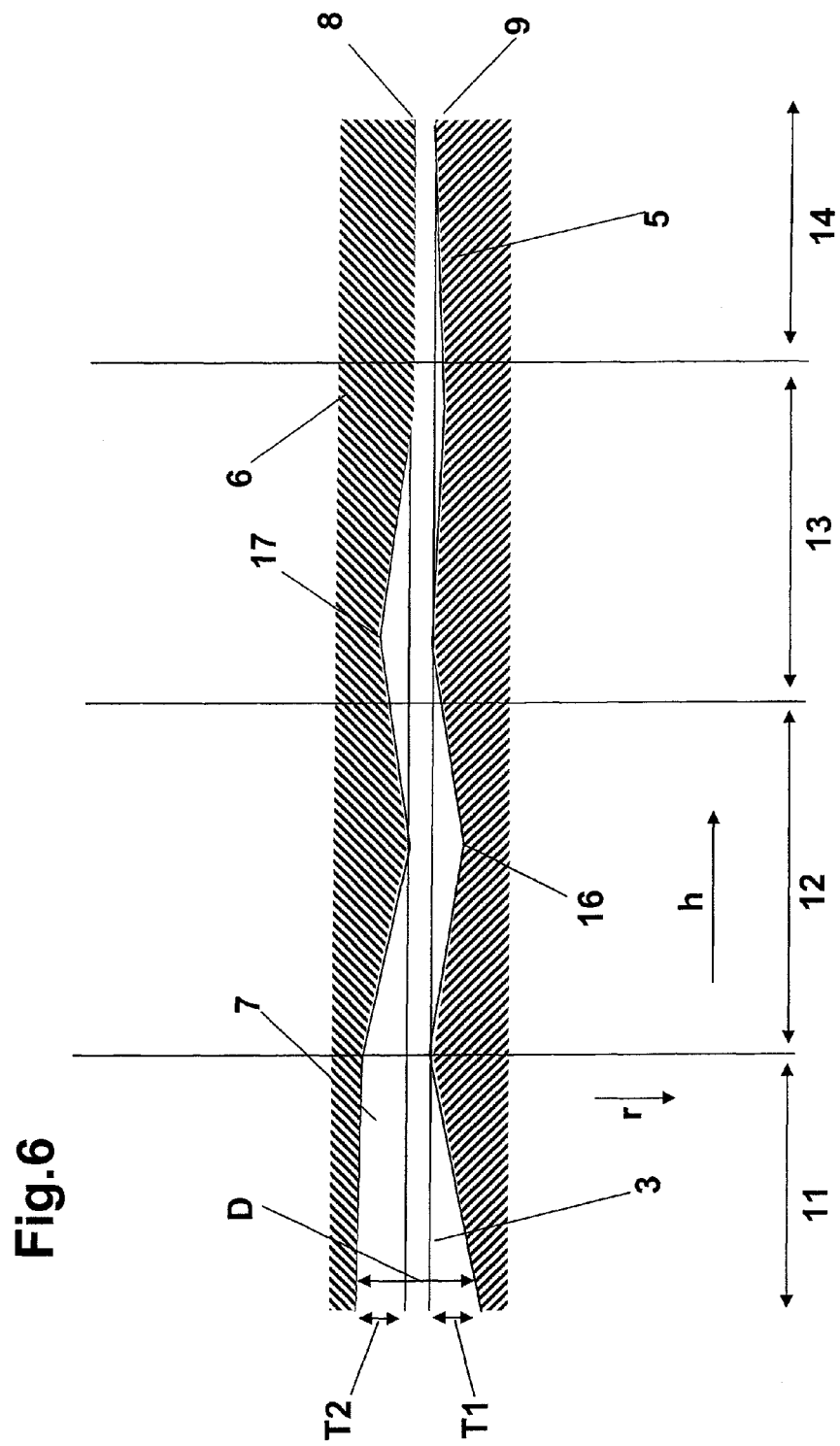

FIG. 6 shows an exemplary embodiment of a melt channel illustrating several aspects of the invention:

In an initial section 11 of the melt channel 10 there are recesses in both boundary walls 5 and 6. The progression of the depths T1 and T2 in the boundary walls is very different, though. It follows a different function and the progression is not phase-delayed, either. In the first central section 12 this is precisely the case:

The depth T1 shows a maximum at the height h of the melt channel 10, which has a minimum at the depth T2. In general, it applies for T1 and T2 in the first central area 12 that their inclines T1' and T2' show the same amount and different algebraic signs.

Such a progression as a function of the height h of the melt channel 10 develops, for example, when T1 and T2 are determined as functions of phase-delayed angular functions. Here, the depths of the recesses could be determined as follows:

$$T1(h) = A \cos(h) e^{(-1/5\, h)}$$

$$T2(h) = A \cos(h + \pi/2) e^{(-1/5\, h)}$$

with A=constant.

As a result, very rounded progressions of the depth of the recesses 3 and 7 develop, which fluctuate between relative minimums and maximums 16 and 17. The respective melt pipeline tapers as a function of the height h. The phasing by $+\pi/2$ leads, as already mentioned, to their inclines T1' and T2' showing the same amount and different algebraic signs. As already mentioned, such a progression is advantageous, particularly in at least one central section 12 and 13 of the melt channel 10.

For the purpose of this application it can be said that the two functions shown above have "the same progression," but are phase delayed, as mentioned.

It is particularly surprising that an intentional deviation from the above-stated rule shows advantages, at least in the area of the melt channel.

In one end section of the melt channel 10 shown in FIG. 6, only recesses are discernible in the interior boundary wall 6.

In the end section 14 the progression of the function T1(h) is therefore subject to a considerably different progression than the progression of the function T2(h), which continues periodical.

A similar, slightly rounded section can be achieved by the following functions:

$$T1(h) = 0$$

$$T2(h) = A \cos(h + \pi/2) e^{(-1/5\, h)}$$

In the central sections 12 and 13

$$T1(h) = k$$

would be more advantageous with k=constant and k>0.

Figure 7:
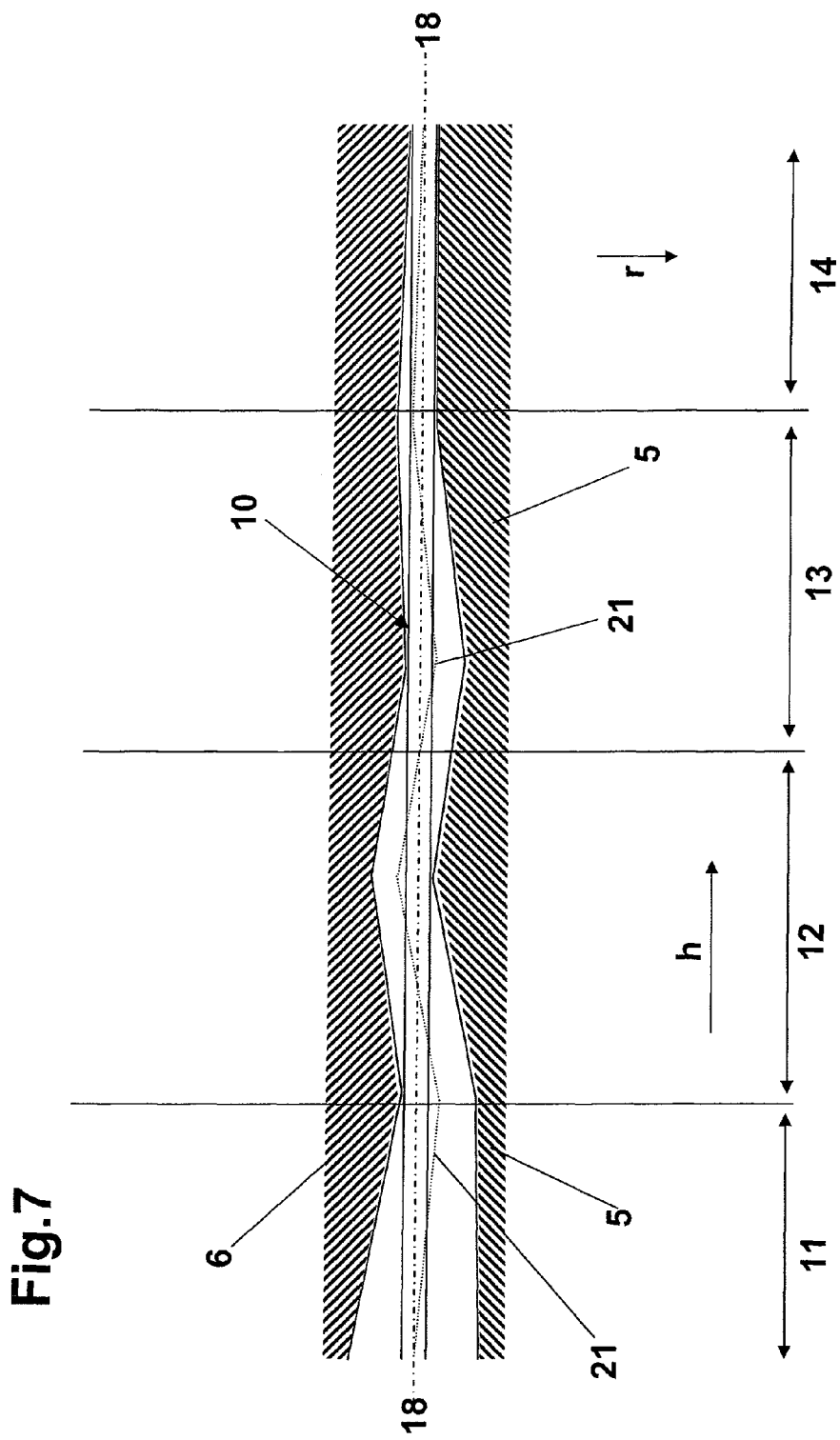

The mathematically trained expert detects several relative extremes in the progression of the depth T1 (h) and T2 (h) of the recesses 3 and 7 in FIGS. 6 and 7, in which the first derivation of the depth T1 (h) and T2 (h) is equivalent to zero in reference to the progression variant h. These relative extremes include the relative maxima 16 and 17 in FIG. 6. It has shown that it is advantageous to provide less than four relative extremes per boundary wall.

Here, two or three extremes may show advantages in certain applications.

FIG. 7 shows an exemplary embodiment of the progression of a melt channel 10, which is very similar to the melt channel shown in FIG. 6. In FIG. 7 the progression of the central line 21 of the melt channel 10 and the central line 18 of the extrusion gap 4 must be observed.

The central line 18 displays the center of the extension of the extrusion gap in the r-direction in the perspective selected in FIG. 7.

The central line 21 displays the center of the extension of the melt channel 10 in the r-direction in the perspective selected in FIG. 7. In stack die blowing heads, which comprise flat perforated disks, here the extension of melt channels and extrusion gaps would be assumed in the axial direction z of the blowing head.

In the end section 14 of the melt channel 10 illustrated in FIG. 7, no intersection occurs of the two central lines 18 and 21. In stack die blowing heads comprising flat perforated disks, the extension in the axial direction of the blowing head would be assumed here.

Figure 8:
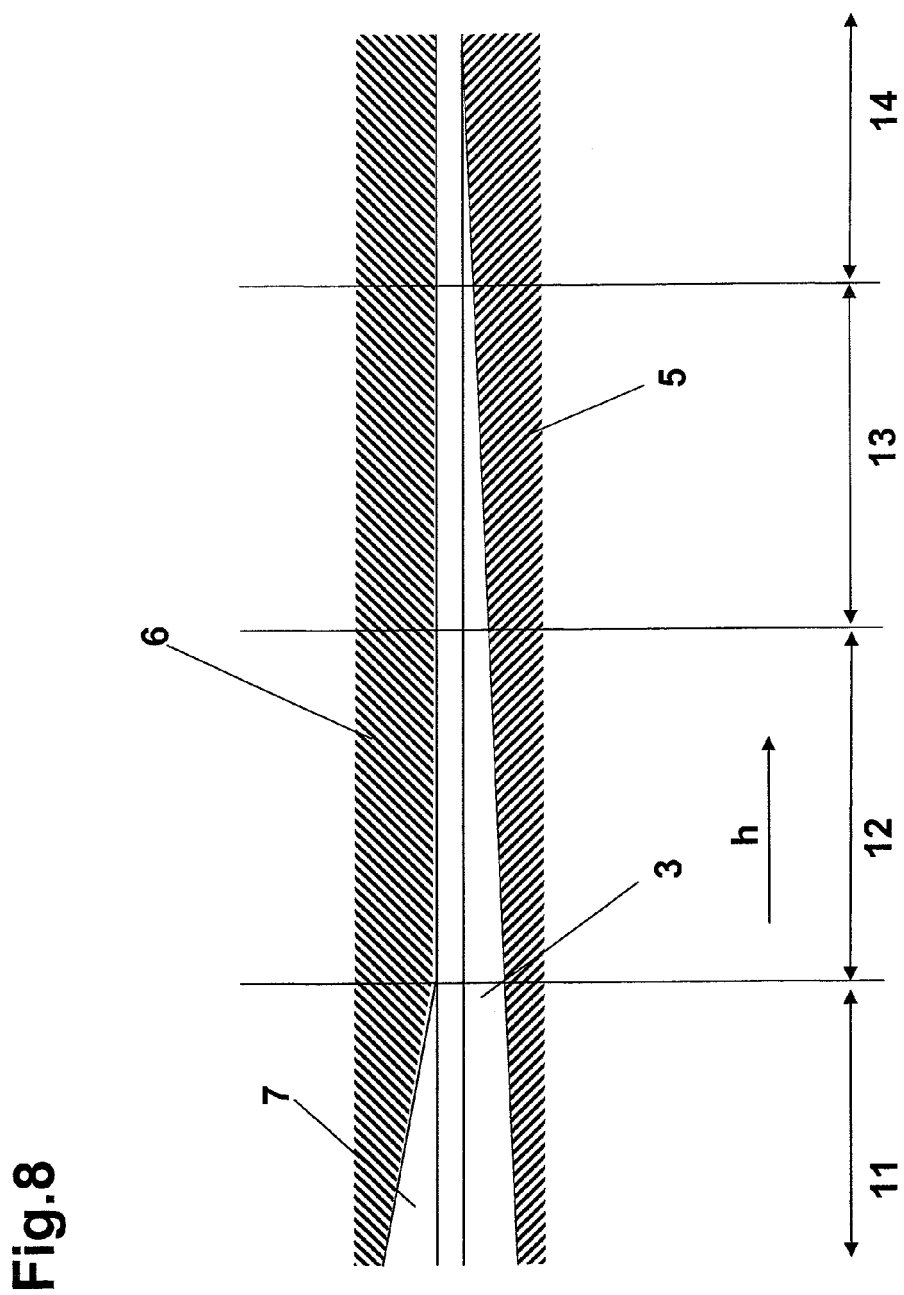

FIG. 8 shows an exemplary embodiment of a melt channel which is formed only in the starting section 11 by recesses 3, 7 in two boundary walls 5, 6.

FIG. 9 shows once more a body wrap of the circumferential area of an inner mandrel 5, which simultaneously represents the internal boundary wall of an extrusion gap 4. However, contrary to FIG. 3, in FIG. 9 only four recesses 3a to d are shown in the boundary wall 5, in order to allow better illustrating details.

The melt, not shown, penetrates from the melt pipelines 22 into the area of the melt channels 10, which among other things, are formed by the above-mentioned recesses 3a through d. The melt is then first guided largely through the melt channels 10 in the direction of the run variable h, thus in the direction of the axes of the melt channels 10. However, a certain portion of melt always flows into the extrusion gap 4. The melt, being subject to considerable pressure, changes its direction of motion here and for the most part approaches the extrusion gap in the axial direction z of the film blowing head 1. This circumstance is symbolized by the arrows 23.

In FIG. 9, sections 11 through 14 relate to the first recess 3a in reference to the circumferential direction f. In the starting section 11 of the recess 3a, which in the circumferential direction f reaches to the start of the next recess 3b, the recess 3a represents the first recess in the axial direction z. It is therefore easily discernible that the recess 3a in this area is not flown over by the melt, which had to come from another recess. Thus, the starting section 11 can also be called the overflow section set to zero in this context.

In the first central section 12 the recess 3a is already flown over by melt originating from the recess 3b and it has penetrated therefrom into the extrusion gap. Therefore the first central section 12 can also be called the first overflow section.

Accordingly the second central section 13 can be called the second overflow section and the end section 14 the third overflow section. The measures suggested in this publication for the starting section 11, the first central section 12, the second central section 13, and the end section 14 are particularly advantageous when they relate to the above-mentioned different overflow sections.

Generally, the recesses of such blowing heads show an even greater number of different overflow sections. Accordingly, it can be said regarding the length of sections 11 through 14 in the sense of this publication that they range approximately from one fourth to one tenth of the length of the respective melt channel.

In light of the background of the statements made in reference to FIG. 9, additional advantageous embodiments of the invention can be shown:

As already mentioned above, it is particularly advantageous when at least one melt channel is formed in its starting section by recesses 3, 7 in its two boundary walls 5, 6. As also already mentioned, additional advantages are given when at least one of the sections following the channel 10 in the direction h is formed by recesses 3, 7 in only one wall. This seems most advantageous in the end section 14 (last overflow section).

When the recesses 3, 7 in the first overflow section 11 set to zero jointly form the melt channel 10 it is additionally advantageous if the recess ending first ends not directly after passing the overflow section set to zero but only thereafter. It is advantageous when the recess 7 ends first in the exterior boundary wall. The outermost gap of a blowing head with circular cylindrical extrusion gaps and the uppermost gap of the stack die blowing head are an exception from this rule: here the recesses 7 in the outermost boundary wall 6 or the uppermost boundary wall shall extend farther than the recesses 3 in the respective other wall 5.

With regards to the path length of the shorter recesses after the end of the first overflow section 11 it has shown that it may well range within the length of the sections 11, 12, 13, 14. This additional length of the respectively shorter recesses 3, 7 beyond the first overflow section 11 can therefore range from 10% to 30%, preferably from 15 to 25% of the overall length of the respective melt channel 10.

The following FIGS. 10 through 12 relate to the embodiment of the recesses 3, 7 inserted in the two different boundary walls 5, 6 and jointly forming a melt channel 10.

For illustration purposes the width of the recesses in the three figures in reference to the length (extending in the "h-direction") is shown excessive.

FIG. 10 shows the recess 3. It comprises an edge 27, which is located at both sides of the recess. Recesses 3, 7 of the type shown in the figures are generally inserted by cutting tools into the boundary walls 5, 6 of the extrusion gap. As shown in FIG. 10, the recesses taper continuously from their start to their end. From the statements made in the present publication it is discernible that a tapering of the recesses, except for certain periodic and non-periodic variations, is desirable, because the melt shall be dispensed successively from the melt channel 10 to the extrusion gap 4. The recess 3 is easily produced as a cut groove, with here the cutting tool during the cutting process moves in the direction of the extension of the groove and here is continuously pulled out of the respective boundary wall 5.

FIG. 11 shows a recess 7 in a boundary wall 6. In this exemplary embodiment the recess 7 is shorter than the recess 3 in FIG. 10 (the reference characters 3 and 7 as well as 5 and 6 could also be interchanged for the purposes of FIGS. 10 through 12). The reason for the shortening is a considerable increase in speed by which the recess 7 tapers after it has "passed" the line 29, which separates the sections 11 and 12 in the "h-direction."

The recess 7 of FIG. 11 can also be produced by first the cutting tool similarly producing the start section of the recess 7, as occurred regarding the recess 3 of FIG. 10. After passing the line 29 the cutting tool 29 is pulled out faster from the boundary wall 6 than from the recess 3 in FIG. 10.

When the two recesses 3 of FIGS. 10 and 7 of FIG. 11 jointly form a boundary channel and the axes of symmetry 24 and 25 of the two recesses are aligned with each other the respective boundary channel 10 would be formed in its start section 11 by two symmetric recesses.

In the first central section 12, which follows the line 29, and in which the recess 7 tapers stronger than the recess 3 (for the purpose of this publication "tapering section") the two recesses 3 and 7 would still be positioned over top of each other. However, the two edges 28 of the recess 7 (in the "r-direction") would be positioned over the recess 3. It has shown that such an arrangement is problematic and that it is advantageous when at least one of the two boundary walls 28 of the recess 7 is not located in the r-direction above the recess 3. This is possible, for example, when the recess 7 shown in FIG. 12 jointly with the recess 3 of FIG. 10 forms a melt channel. When these two recesses are arranged in reference to each other such that their lines of symmetry 24 and 25 are aligned with each other in the r-direction then the two right exterior boundary lines 27 and 28 are located over top of each other. Only the boundary line 28, left in the circumferential direction φ, is positioned over the recess 3 behind the line 29 to its end 28, thus in the tapering section. Such a type of arrangement of the recesses 3, 7 in which at least two of the edges 27 and 28 are located on top of each other (here in the starting section 11) and in the section in which a recess tapers to a greater extent (tapering section) has proven advantageous in tests performed. In the recess 7 of FIG. 12, two lines of symmetry 25 and 26 are provided, which form an angle α. The lines of symmetry 24, 25, and 26 also indicate the path passed by the primary axis of symmetry of the cutting tool during the production of the recesses 3 and 7.

In FIGS. 1 through 12 details of film blowing heads 1 with circular cylindrical extrusion gaps 4 are explained. In this type of blowing heads the application of the present invention shows particular advantages. However, the embodiment of stack die blowing heads with the features shown is also advantageous. Many of the above-stated explanations can directly be applied to stack die blowing heads. Frequently it is only necessary to exchange the z-coordinates and the r-coordinates in the figures in order to transfer the statements from the film blowing heads 1 with circular cylindrical extrusion gaps 4 to stack die blowing heads.

Longer recesses or grooves 3 are advantageously provided in the boundary walls of the extrusion gap of film blowing heads, which later form the exterior skin of multi-layer film composites.

The invention being thus described, it will be apparent that the same may be varied in many ways Such variations are not to be regarded as a departure from the spirit and scope of the invention, and all such modifications as would be recognized by one skilled in the art are intended to be included within the scope of the following claims.

LIST OF REFERENCE CHARACTERS 1
2
3 recess/groove in the interior boundary wall
4 extrusion gap
5 inner mandrel, interior boundary wall of the extrusion gap
6 housing, exterior boundary wall of the extrusion gap
7 recess/groove in the exterior boundary wall
8 interior boundary line of the extrusion gap
9 exterior boundary line of the extrusion gap
10 melt channel
11 starting section
12 first central section
13 second central section
14 end section
15
16 relative maximum T1
17 relative maximum T2
18 central line of the extrusion gap 4
19 arrows (direction of flow of the melt)

20 magnifying glass (section FIG. 2)
21 central line of the melt channel 10
22 melt pipeline
23 arrow melt transportation
24 axis of symmetry of the recess 3
25 axis of symmetry of the recess 7
26 axis of symmetry of the recess 7 after change of direction
27 edge of recess 3
28 edge of recess 7
29 line between sections 11 and 12
z axial cylinder coordinates
r radial cylinder coordinates
φ cylinder coordinates in the circumferential direction
h run variable (coordinate) in the spatial direction along the progression of the melt channel/"height"
T1 depth of the recess in the interior wall in the direction of the radial cylinder coordinates, measured from the boundary line 8 of the extrusion gap
T2 depth of the recess in the exterior wall in the direction of the radial cylinder coordinates, measured from the boundary line 9 of the extrusion gap
α angle between the lines of symmetry 25 and 26
3a first recess/groove in the interior boundary wall
3b second recess/groove in the interior boundary wall
3c third recess/groove in the interior boundary wall
3d fourth recess/groove in the interior boundary wall

What is claimed is:

1. A film blowing head for producing a film tubing from a single or multi-layer film, comprising:
   at least one extrusion gap to form a film layer, said at least one extrusion gap being embodied between two boundary walls,
   with at least one melt pipeline mouthing into the at least one extrusion gap,
   said at least one melt pipeline converting inside the at least one extrusion gap into a first melt channel,
   which is formed in at least one section of a progression of at least one of the first melt channel by recesses in the two boundary walls of the a least one extrusion gap,
   and distributing a melt in the at least one extrusion gap, the first melt channel tapering in the progression in a direction of transportation of the melt (h), and in an end section of the first melt channel converting entirely into the at least one extrusion gap,
   in which the first melt channel is configured in one of the sections only by recesses in one of the two boundary walls,
   with axes of symmetry of both recesses in the two boundary walls being aligned with each other at least up to a boundary line,
   the section of the first melt channel, which is only formed by the recesses in one of the two boundary walls, representing at least a last overflow section, and
   the at least one extrusion gap being a circular cylindrical extrusion gap.

2. The film blowing head according to claim. 1, wherein a depth (T1, T2) of the recesses increases at least in one of the two boundary walls in the at least one section of the at least one first melt channel in the direction of transportation of the melt.

3. The film blowing head according to claim 1, wherein an amount of change of a depth (T1, T2) of the recesses in the two boundary walls is different at a height (h) of the at least one first melt channel in the at least one section of the melt channel, which is not the end section, in the direction of transportation of the melt (h) in the melt channel.

4. The film blowing head according to claim 1, wherein a change of a depth (T1, T2) of the recesses in one of the two boundary walls in the at least one section of the at least one first melt channel, which is not the end section, is subject to a different function in the direction of transportation (h) of the melt in the melt channel than the change of depth (T1, T2) of the recesses in another of the two boundary walls, respectively.

5. The film blowing head according to claim 1, wherein a depth (T1, T2) of the recesses has less than four relative extremes in at least one or the two boundary walls.

6. The film blowing head according to claim 1, wherein a central line of the at least one first melt channel, which marks a center of an extension of the at least one melt channel in the direction of an extension perpendicular thereto relative to the direction of transportation of the melt in the at least one extrusion gap and perpendicular thereto relative to the direction of transportation of the melt in the at least one melt channel, and
   wherein the at least one section of the progression of the melt. channel between a maximum of a depth (T1, T2) of the recesses in a first of the boundary walls and between a maximum of the depth of the recesses in a second of the boundary walls does not intersect a central line of the at least one extrusion gap,
   the central line marking the center of the extension of the at least one extrusion gap in the direction of an extension perpendicular thereto relative to the direction of transportation (h) of the melt in the at least one melt channel and perpendicular relative to the direction of transportation of the melt in the at least one extrusion gap.

7. The film blowing head according to claim 1, wherein the at least one first melt channel has an overflow section set to zero, with no melt flowing over the overflow section, and another overflow section, with the melt of at least one second extrusion gap flowing over the another overflow section, and with at least the first melt channel in the overflow section set to zero being formed by the recesses in both of the boundary walls of the at least one extrusion gap.

8. The film blowing head according to claim 7, wherein the at least one first melt channel is formed in the starting section of the overflow section directly following the overflow section set to zero is formed by the recesses in the two boundary walls of the at least one extrusion gap.

9. The film blowing head according to claim 8, wherein the at least one first melt channel is formed by the recesses in the two boundary walls of the at least one extrusion gap in the starting section of the overflow section, which directly follows the overflow section set to zero, and
   wherein the starting section has a length that is from 10 to 30% of an overall length of the at least one first melt channel.

10. The film blowing head according to claim 1, wherein the at least one first melt channel is formed at least in one of the sections by the recesses in both of the boundary walls of the at least one extrusion gap, and
    wherein the section then converts into a section in which one of the two recesses tapers to a greater extent than another of the two recesses,
    such that in a tapering area a boundary wall of one of the two recesses and a boundary wall of the another of the two recesses are aligned with each other.

11. The film blowing head according to claim 1, wherein at least two of the extrusion gaps are equipped with two of the boundary walls each, which are provided with the recesses, and which have a greater length in the first boundary wall than in the second boundary wall, respectively.

12. The film blowing head according to claim 11, wherein the first boundary wall of the first extrusion gap has an inverse alignment relative to the first extrusion gap than the first boundary wall of the second extrusion gap has relative to the second extrusion gap.

13. The film blowing head according to claim 12, wherein the first and the second extrusion gap are aligned relative to each other such that the first boundary wall of the first extrusion gap contacts a first surface of the film in a friction-causing manner, and the first boundary wall of the second extrusion gap contacts a second surface of the film.

14. The film blowing head according to claim 9, wherein the starting section has a length that is from 15 to 25% of the overall length of the at least one first melt channel.

15. A film blowing head for producing a film tubing from a single or multi-layer film, comprising:
- an extrusion gap to form a film layer from a melt, said extrusion gap being located between two boundary walls, with a melt pipeline opening into the extrusion gap,
- said melt pipeline converting inside the extrusion gap into a first melt channel provided in a section of a progression of the first melt channel by recesses in the two boundary walls of the extrusion gap, and distributing the melt in the extrusion gap, the first melt channel tapering in the progression in a direction of transportation of the melt (h), and in an end section of the first melt channel converting entirely into the extrusion gap,
- the first melt channel being configured in one of the sections by the recesses being present in both of the two boundary walls,
- with axes of symmetry of both of the recesses in the two boundary walls being aligned with each other at least up to a boundary line,
- a section of the first melt, channel, which has only one of the recesses in one of the two boundary walls, representing at least a last overflow section and
- the section of the first melt channel, which has the recesses in both of the two boundary walls, converting into a section in which one of the recesses tapers to a greater extent than another of the recesses, such that in a tapering area the boundary wall of one of the recesses and the boundary wall of the other of the recesses are aligned with each other.

16. The film blowing head according to claim 15, further comprising a second extrusion gap.

* * * * *